T. R. BEGGS.
METHOD AND APPARATUS FOR COOLING BEER.
APPLICATION FILED SEPT. 28, 1916.
1,289,364.
Patented Dec. 31, 1918.
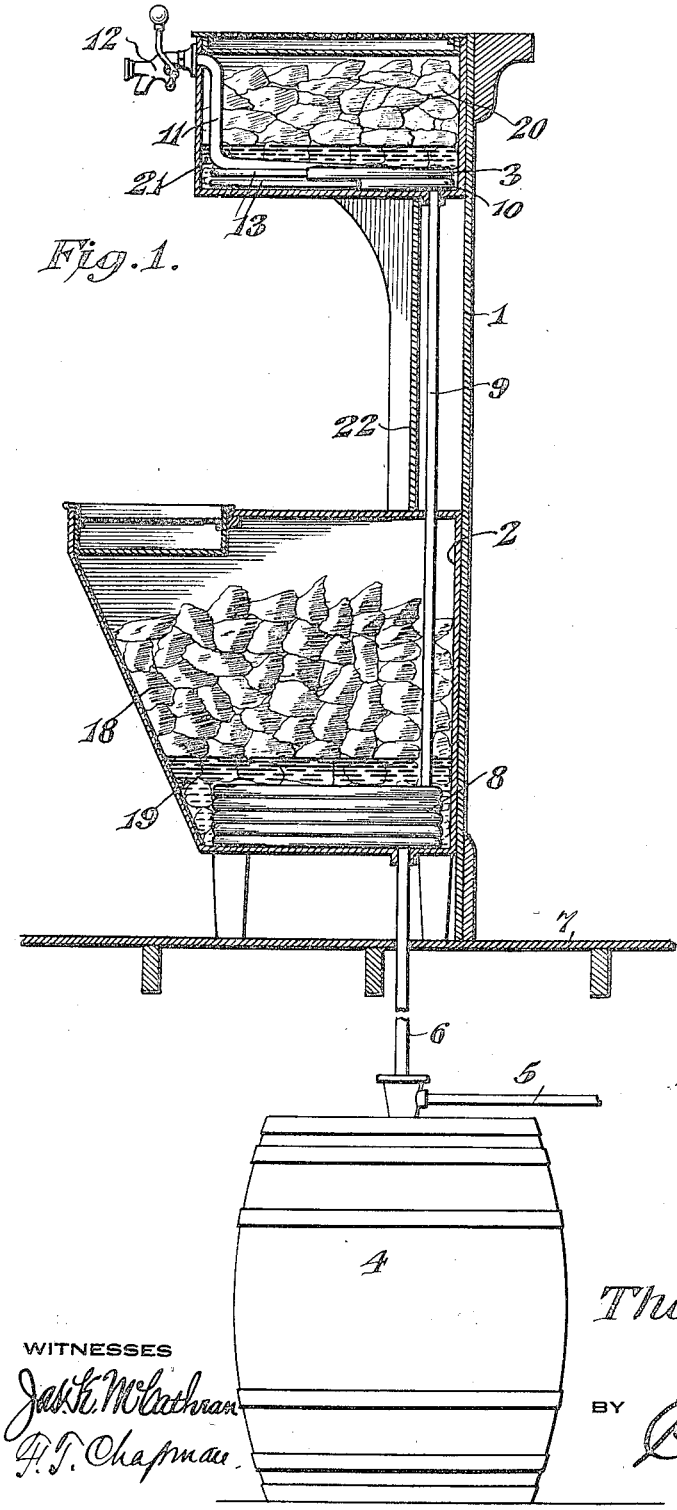
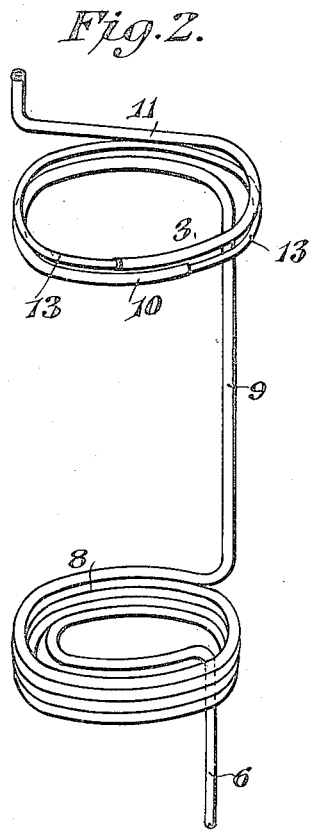
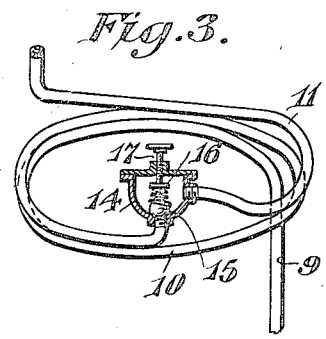
Thomas R. Beggs, INVENTOR

UNITED STATES PATENT OFFICE.

THOMAS R. BEGGS, OF NEW YORK, N. Y.

METHOD AND APPARATUS FOR COOLING BEER.

1,289,364.  Specification of Letters Patent.  Patented Dec. 31, 1918.

Application filed September 28, 1916. Serial No. 122,692.

*To all whom it may concern:*

Be it known that I, THOMAS R. BEGGS, a citizen of the United States, residing at New York, in the county of New York and State of New York, have invented a new and useful Method of and Apparatus for Cooling Beer, of which the following is a specification.

This invention has reference to a method of and apparatus for cooling beer, and its object is to avoid the necessity of cooling the beer in the keg and to prevent excessive foaming of the beer on drawing it from the faucet.

It has heretofore been considered impossible to successfully draw beer unless the beer in the keg was in a cold condition, wherefore it has been the custom to provide a large ice box in the cellar and keep the kegs in such box, which latter is kept full of ice all the time, since otherwise there is large wastage in drawing the beer.

It is the custom to subject the beer in the keg to a comparatively low air pressure, say, about fifteen pounds, thereby forcing the beer through the customary cooling coils, which are about thirty-five feet in length, to the faucet. Even under these customary conditions there is excessive foaming on drawing the beer from the faucet because of the escape of the carbonic acid gas with which the beer is charged, such escape occurring as the beer passes through the cooling coils and issues from the faucet. There is always preliminary waste in drawing the beer, and this often amounts to nearly half the beer contained in the keg.

By the present invention the length of the cooling coil is largely increased, being nearly double the ordinary length, and the air pressure in the keg is also largely increased. Moreover, the cooling of the beer in the keg is entirely done away with, the high pressure employed being sufficient to hold the carbonic acid gas in the beer, so that it escapes only as drawn and the foam caused is only such as is desirable. The long length of the pipe provides sufficient cooling surface so that the cooling of the beer occurs wholly within the regular cooling box located under the counter, and by the introduction in the cooling pipe of throttling means at a relatively short distance from the faucet the pressure is maintained between such throttling means and the keg even though the beer be at the time flowing from the faucet. The pressure is relieved by a continuation of the pipe between the throttling means and the faucet, so that there is a chance of the escape of the carbonic acid gas and the production of the desired amount of foam only as the beer issues from the faucet, while at the same time the throttling means avoids a rush of the beer through the faucet which would otherwise occur in the absence of the throttling means, whether such throttling means be localized, or whether it be due to a sufficient length of pipe to serve the purpose.

The present invention effects a very marked saving in ice, since it eliminates the ice box customarily employed to house the beer keg, and it eliminates the excessive foaming which represents a loss of from ten to thirty per cent of the beer.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is an upright sectional view of a cooling chest such as is customarily located under the counter, with the cooling coils arranged in accordance with the present invention.

Fig. 2 is a more or less diagrammatic view in perspective of the arrangement of cooling coils.

Fig. 3 is a more or less diagrammatic representation of the upper cooling coil and a modified form of throttling device included therein.

Referring to the drawings, there is shown a counter 1 which may be of ordinary construction and needs no special description. Associated with the counter there is a cooling chest 2 usually arranged close to the floor and another cooling chest 3 usually arranged so that its top is level with the top of the counter. So far as the cooling chests are concerned, they may follow the usual construction and, therefore, require no special description.

As saloons are usually located on the ground floor, the beer kegs are located in the cellar, and in Fig. 1 there is shown a beer keg 4 assumed to be so located. While it is the practice to inclose the beer kegs in an ice box, the present invention eliminates the ice box, wherefore the beer keg, although located in the cellar, is at all times accessible, and the original expense of an ice box, as well as the constant expense for ice to cool the beer in the keg, is avoided.

Leading into the keg is a pipe 5 which may be assumed as connected to an air pump for producing air pressure within the keg. As this is a customary practice, no air pump is shown, but it is to be understood that with the present invention the air pressure is much increased. For instance, the usual air pressure employed is about fifteen pounds. With the present invention the air pressure may be from twenty-eight to forty-five pounds per square inch.

Leading from the keg is a pipe 6 rising through the floor of the bar room, which floor is indicated at 7, and entering the lower cooling chest 2 through the bottom thereof. The pipe 6 within the chest 2 is formed into a coil 8 having one end connected to the pipe 6 and the other end connected to a pipe 9 leading through the top of the chest 2 and entering the chest 3 through the bottom of the latter. Within the chest 3 is another coil 10 having one end connected to the pipe 9 and the other end having a rising portion 11 connected through the upper portion of one side wall of the chest 3 to a drawing faucet 12, which latter should be of large internal capacity equal to the capacity of the pipes forming the coils throughout the main portion of their length.

Included in the coil 3 is a section 13 of less internal diameter than the pipes 6, 9 and 11 and coils 8 and 10, so that the smaller pipe 13 serves as a throttle holding back the flow of beer from the keg through the pipes and coils to the faucet 12.

As an example of an actual installation by means of which the present invention may be carried out, the pipes 6, 9 and 11, the coil 8 and the main portion of the coil 10 may be of three-eighths inch internal diameter, while the throttling pipe 13 may be from one-fourth to five-sixteenths of an inch internal diameter. The coil 8 may contain from forty to fifty feet of pipe and the coil 10 may contain fifteen to twenty feet of pipe of which the section 13 may measure about three feet, while the pipe leading from the section 13 to the faucet 12 may be five or six feet in length. Of course, these dimensions may vary considerably, but the piping is usually considerably longer than is customarily used with the greater portion of the piping included in the coil 8 and the smaller amount in the coil 10, with a few feet of the other piping between the throttling device and the faucet. The section 13 of smaller pipe may be replaced by a valve casing 14 into which the approaching portion of the coil 10 leads, and where the coil 10 opens into the casing 14 there is provided a valve 15 held in the closed position by a spring 16 tensioned to desired extents by a screw 17. The pipe 11 leads from the casing 14 to the faucet 12. The throttling device represented by the casing 14 in Fig. 3 has an advantage over the throttling device represented by the pipe 13 in Figs. 1 and 2 in that the degree of throttling may be varied at will by adjustment of the spring 16 by the screw 17. Where a length of pipe 13 of smaller diameter than the main pipe is used, the degree of throttling must be predetermined and the size and length of the pipe 13 made to agree with such degree of throttling desired.

By subjecting the beer in the keg to relatively high pressure, say from twenty-eight to forty-five pounds per square inch, any free carbonic acid gas in the keg is forced into the beer and there remains, so that the material in the keg is practically all liquid except, of course, the air which is forced into the keg to produce the air pressure. Such pressure maintains the beer within the pipe line leading from the keg to the faucet in the liquid condition.

The chest 2 contains a sufficient quantity of ice, indicated at 18, with enough water, indicated at 19, to cover the coil 8. The chest 3 contains ice, indicated at 20, and sufficient water, indicated at 21, to cover the coil 10, which latter may be of considerably less height than the coil 8, and the ice 20 is maintained at a sufficient height to reach about to the level of the spigot 12, wherefore the beer within the coils and pipe is subjected to the cooling action of the ice from the entering end of the coil 8 to the faucet 12. In order that the pipe 9 where extending from the chest 2 to the chest 3 may be protected from undue radiation and consequent heating, it is inclosed by a casing 22 leading from the chest or box 2 to the chest or box 3.

The beer entering the coil 8 is warm, but under such heavy pressure that the carbonic acid gas does not escape because of such warmth. In passing through the coil 8 the length of travel is so great that the beer is chilled to a temperature of about thirty-eight degrees or less. Thence the beer passes to the coil 10 where it is maintained cold by the ice in the chest 3, so that when the beer issues from the faucet 12 its temperature is about thirty-eight degrees, which is colder than beer has been heretofore drawn.

In the ordinary manner of drawing beer it is first chilled in the keg as before explained, and then drawn through about thirty-five feet of cooling coils, which simply tends to keep the beer cool, but allows it to expand, while being drawn, so that there is a production of foam to a considerable extent through the coils and the production of a large amount of foam in the glass requiring a material waste of the beer in order to get the requisite amount of liquid with but a small amount of foam on top of the liquid. The foaming is due to the fact that on opening the faucet there is a reduction of pressure through a relatively long line of pipe with the resultant escape of the corbonic acid gas from the beer in the pipe, thereby producing a large amount of foam.

With the present invention the opening of the faucet produces a reduction of pressure in a relatively small length of pipe immediately adjacent to the faucet, while the pressure is held back in the main portion of the pipe by the throttling device whether it be the length of smaller pipe 13 or the throttling device illustrated in Fig. 3, the action being similar in the two cases. This throttling has a further advantage in preventing a sudden gush of beer through the opened faucet due to the high pressure at the keg, for if the throttling device were absent there would be no impediment to a forceful rush of beer through the pipe because of the pressure back of it.

The short length of the full size pipe immediately adjacent to the faucet provides an expansion chamber between the throttling or choke pipe 13 and the faucet, whereby the tendency of the beer to jet beyond the choke pipe is prevented by the larger body of beer contained in the expansion pipe between the choke pipe and the faucet, which latter, having the passage through it at least as large as the expansion pipe, contributes to the prevention of gushing of the beer.

By the present invention the cooling of the beer is performed by an increased length of cooling pipe resulting in the discharge of the beer through the faucet at a lower temperature than heretofore and with the elimination of the customary ice box heretofore considered necessary for cooling beer within the keg. Because of the increased length of cooling pipe heavier pressure is employed to overcome the friction of the pipe with the further result that the increased pressure prevents the formation of foam in the keg when the beer is drawn, so that only liquid beer is conducted through the cooling pipes and the cooling of the beer is therefore facilitated, since the pressure of foam retards the extraction of heat from the beer.

By the introduction of throttling means and expansion means between the throttling means and the faucet, the gush of beer from the faucet because of the high pressure back of it is prevented. Since foaming can only occur practically at or just behind the faucet, such foaming is reduced to a minimum and the requisite amount of liquid may be drawn into the glass without waste due to excessive foaming.

If the beer is allowed to expand after it leaves the keg it will foam regardless of the temperature of the beer, and if the pressure be relatively low and the cooling coils relatively large the foaming will occur on the opening of the faucet, and such foam cannot be again compressed into the beer. The compression must be maintained from the keg to or close to the faucet, and this requires a certain amount of back pressure or frictional resistance, which is a thing which it has been the endeavor heretofore to avoid. The requisite resistance may be provided in various ways. One is to increase the length of pipe in the coils. Another is to introduce a choke pipe with the pipe increasing to normal diameter beyond the choke pipe for a short distance before the beer reaches the faucet, or it may be accomplished by a suitable regulator or throttling device of the type illustrated in Fig. 3. All these different arrangements result in holding the pressure until the beer has become thoroughly chilled.

Experience has shown that in cold weather a pressure of twenty-eight pounds on the beer in the keg will give good results, while in warm weather the pressure must be increased, sometimes as high as forty-five pounds.

What is claimed is:—

1. The method whereby beer may be drawn without undue foaming from kegs maintained at atmospheric temperature, which consists in subjecting the beer in the keg to a pressure sufficient to maintain carbonic acid gas in the absorbed state in the beer, cooling the beer after leaving the keg with the stated pressure maintained and reducing the pressure on the beer while still cool and immediately prior to its escape to the atmosphere.

2. The method whereby beer may be drawn without undue foaming from kegs maintained at atmospheric temperature, which consists in subjecting the beer in the keg to a pressure sufficient to maintain carbonic acid gas with which the beer is charged in the absorbed state in the beer, conducting the beer while under the stated pressure through a chilling zone to the point of drawing off the beer, and increasing the resistance to the flow of beer immediately preceding the point of drawing the beer and within the chilling zone.

3. The method whereby beer may be drawn from kegs without undue foaming and at minimum temperature, which consists in subjecting the beer in the keg to a pressure sufficient to maintain carbonic acid gas in the absorbed state in the beer, chilling the beer in transit from the keg to the drawing faucet, and establishing back pressure in the course of the beer to the faucet sufficiently resistant to the flow of the beer to maintain the initial pressure thereon during transit, whereby foaming of the beer before and gushing of the beer issuing from the faucet is minimized.

4. Means for drawing beer in a chilled condition and without undue foaming from kegs having beer therein at atmospheric temperature, comprising piping for connecting the keg to a drawing faucet and of a length and size to provide resistance to the flow of beer therethrough permitting a pressure within the beer keg sufficient to force free carbonic acid gas into the beer and maintain such carbonic acid gas in the absorbed state in the beer, and means for containing a chilling medium and through which means the piping extends, such means being located between that portion of the piping designed to be connected to the beer keg and the faucet from which the beer is drawn.

5. Means for permitting the drawing of beer, in the chilled condition and without undue foaming, from a keg containing beer at ordinary atmospheric temperature, consisting of means for containing a chilling medium and piping of a length and size to maintain carbonic acid gas in the beer while flowing through the pipe, said piping extending through the container for the chilling medium and also being of a length to permit subjection of the beer flowing through it to the action of the chilling medium, and said piping having throttling means adjacent to the end connected to the drawing faucet, and between said throttle means and drawing faucet, the piping being of a size to constitute an expansion means for the beer.

6. Means for drawing beer, in a chilled condition and without undue foaming, from a keg containing beer at atmospheric temperature, comprising containing means for a chilling medium and connected coils of pipe in the containing means and located between the keg of beer and the drawing faucet and of a length to permit the application of the chilling medium for a sufficient time to cool the beer to the desired temperature, said pipe containing throttling means opposing the flow of beer through the pipe, and between the throttling means and the faucet constituting an expansion means for reducing the pressure on the beer to permit moderate foaming and avoid gushing of the beer while issuing from the faucet.

7. Means for drawing beer in a chilled condition and without undue foaming from kegs containing the beer at ordinary atmospheric temperature, comprising coils of pipe introducible between the keg and the drawing faucet and of a length to permit subjecting the beer to a cooling medium for a sufficient length of time to chill the beer to the desired temperature, said pipe containing a section of reduced diameter to provide increased resistance to the passage of beer therethrough with the reduced pipe located adjacent to the drawing faucet and separated therefrom by a relatively short length of pipe of the same diameter as the remainder of the pipe.

In testimony that I claim the foregoing as my own, I have hereto affixed my signature in the presence of two witnesses.

THOMAS R. BEGGS.

Witnesses:
 WILLIAM AGUSTUS PRICE,
 DANIEL MINER.